United States Patent [19]
Maeda et al.

[11] Patent Number: 5,949,639
[45] Date of Patent: Sep. 7, 1999

[54] CAPACITOR ELEMENT FOR SOLID ELECTROLYTIC CAPACITOR, DEVICE AND PROCESS FOR MAKING THE SAME

[75] Inventors: Takahiro Maeda; Shouichi Yanagi; Chojiro Kuriyama, all of Kyoto, Japan

[73] Assignee: Rohm Co., Ltd., Kyoto, Japan

[21] Appl. No.: 08/937,795

[22] Filed: Sep. 25, 1997

[30] Foreign Application Priority Data

Sep. 27, 1996 [JP] Japan .................................. 8-256194

[51] Int. Cl.$^6$ ............................ H01G 9/00; H01G 9/042
[52] U.S. Cl. .................... 361/523; 361/528; 361/529; 29/25.41
[58] Field of Search ................................ 361/523, 528, 361/529, 530, 531, 532, 533, 540; 29/25.41, 25.42

[56] References Cited

U.S. PATENT DOCUMENTS

| | | | |
|---|---|---|---|
| 2,042,283 | 3/1936 | Van Arkel et al. ................. | 361/508 |
| 3,345,545 | 10/1967 | Bourgault et al. ................. | 361/529 |
| 5,461,538 | 10/1995 | Kuriyama ........................... | 361/528 |
| 5,483,415 | 1/1996 | Nakamura et al. ................. | 361/529 |

FOREIGN PATENT DOCUMENTS 7-74062  3/1995  Japan ........................... H01G 9/052

OTHER PUBLICATIONS

JP 08031700 A., In: Patent Abstracts of Japan, Feb. 2, 1996.

*Primary Examiner*—Kristine Kincaid
*Assistant Examiner*—Anthony Dinkins
*Attorney, Agent, or Firm*—Michael D. Bednarek; Crowell & Moring LLP

[57] ABSTRACT

A capacitor element for a solid electrolytic capacitor includes a capacitor chip which is a compacted mass of valve metal powder, and an anode wire projecting from a first end face of the capacitor chip. The capacitor chip includes at least one side face which is formed with at least one depression extending toward but short of a second end face of the capacitor chip opposite to the first end face.

11 Claims, 8 Drawing Sheets

CAPACITOR ELEMENT FOR SOLID ELECTROLYTIC CAPACITOR, DEVICE AND PROCESS FOR MAKING THE SAME

BACKGROUND OF THE INVENTION

1. Field of the Invention

The present invention relates to a capacitor element for a solid electrolytic capacitor such as tantalum capacitor or aluminum capacitor. The present invention also relates to a device and a process for making such a capacitor element.

2. Description of the Related Art

Figure 9:
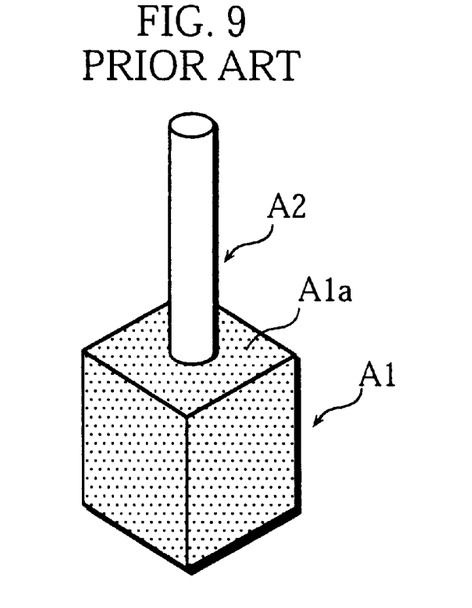
FIG. 9 is a perspective view showing a prior art capacitor element.

As disclosed in U.S. Pat. No. 5,461,538 (corresponding to Japanese Patent Application Laid-open No. 7-74062) and as illustrated in FIG. 9 of the accompanying drawings, a typical capacitor element for a prior art solid electrolytic capacitor includes a porous capacitor chip A1 and an anode wire A2 projecting from a top face A1$a$ of the chip A1. The capacitor chip A1 is prepared by compacting tantalum powder into a porous mass and then sintering the porous mass. The anode wire A2 is also made of tantalum. For providing a capacitor function, the capacitor element is subjected to the following process steps.

Figure 10:
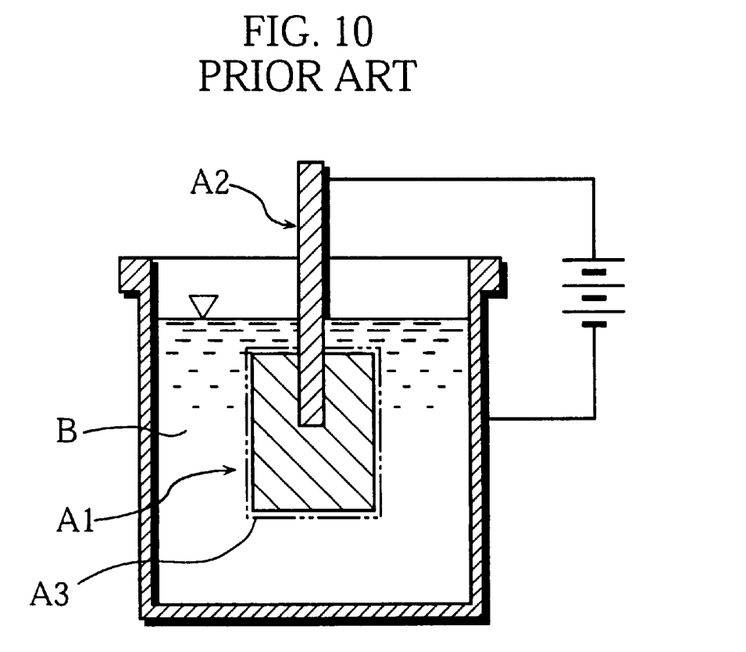
FIG. 10 is a sectional view showing a process step of forming a dielectric layer for the prior art capacitor element.
Figure 11:
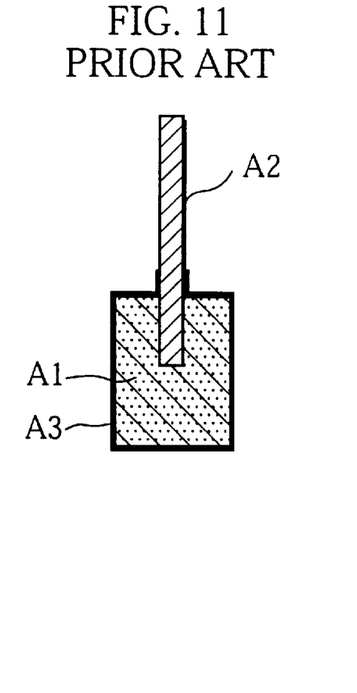
FIG. 11 is a sectional view showing the prior art capacitor element which has undergone the dielectric layer formation.

First, as shown in FIG. 10, the porous sintered capacitor chip A1 is immersed in an aqueous solution B of e.g. phosphoric acid and subjected to anodic oxidation (electrolytic oxidation) by applying a direct current. As a result, a dielectric coating A3 of e.g. tantalum pentoxide is formed on the surfaces of the tantalum particles and on an immersed root portion of the anode wire A2, as shown in FIG. 11.

Figure 12:
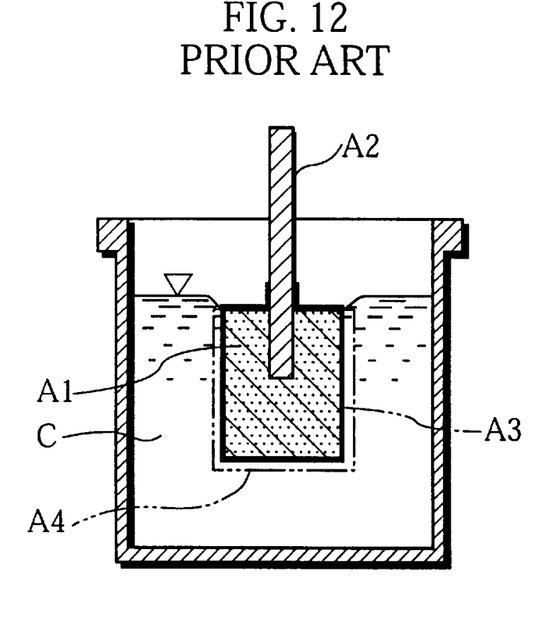
FIG. 12 is a sectional view showing a process step of forming a solid electrolyte layer for the prior art capacitor element.
Figure 13:
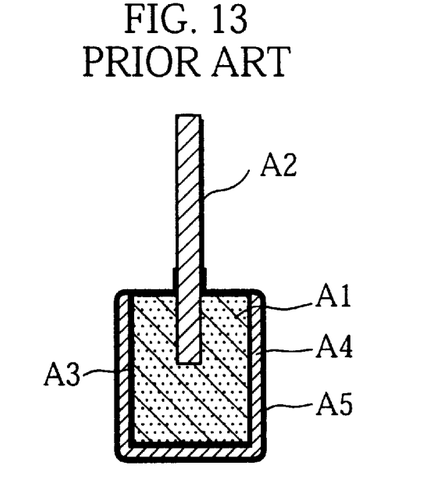
FIG. 13 is a sectional view showing the prior art capacitor element which has undergone the electrolyte layer formation.

Then, the dielectrically coated chip A1 is immersed in an aqueous solution C of e.g. manganese nitrate to such an extent that the top surf ace A1$a$ of the chip A1 is not submerged under the surface of the manganese nitrate solution, the chip A1 being thereafter taken out of the solution for baking. This step is repeated plural times to form a layer A4 of solid electrolyte (e.g. manganese dioxide) on the dielectric coating A3.

Finally, a metallic cathode terminal layer (made of silver or nickel for example) is formed on the solid electrolyte layer with an intervening layer of e.g. graphite being interposed between the cathode terminal layer and the electrolyte layer A4.

A solid electrolytic capacitor incorporating such a capacitor element is known to exhibit a considerably higher impedance under high frequency than a lamination type capacitor. The impedance of the solid electrolytic capacitor is inversely proportional to the contact surface area between the dielectric coating A3 and the solid electrolyte layer A4.

Figure 14:
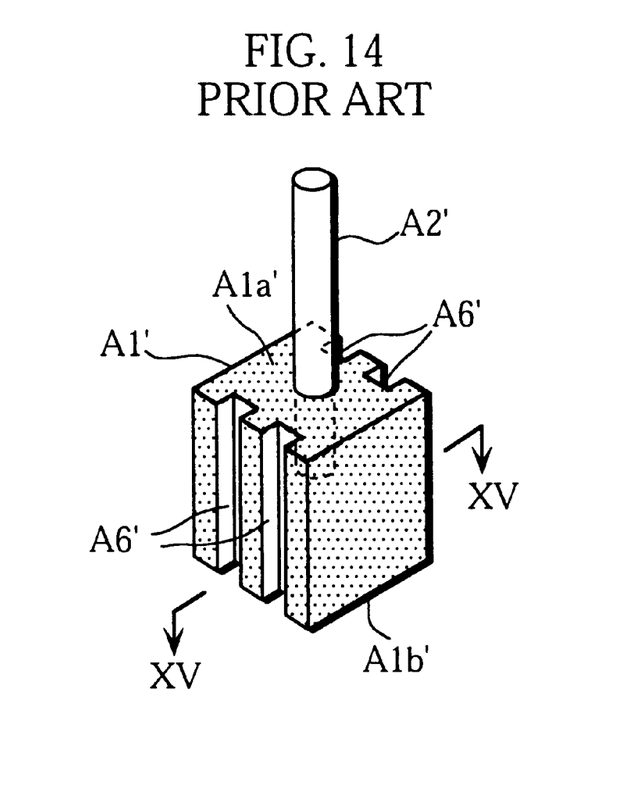
FIG. 14 is a perspective view showing another prior art capacitor element.
Figure 15:
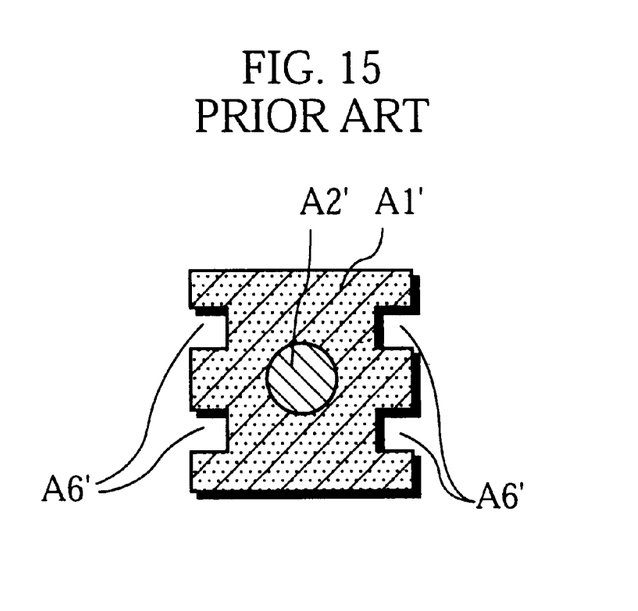
FIG. 15 is a sectional view taken on lines XV—XV in FIG. 14.

For purposes of decreasing the impedance of a solid electrolytic capacitor, a capacitor element is proposed, in U.S. Pat. No. 3,345,545 for example, which includes a porous capacitor chip A1' of tantalum powder laterally formed with a plurality of grooves A6', and an anode wire A2' projecting from the top face A1$a$' of the chip A1', as shown in FIGS. 14 and 15 of the accompanying drawings. Each of the grooves A6' extends all the way from the top face A1$a$' to the bottom face A1$b$'.

The grooves A6' on the capacitor chip A1' increase the contact surface area between a dielectric coating (formed subsequently) and a solid electrolyte layer (also formed subsequently), thereby decreasing the impedance of the capacitor. Further, the grooves A6' also facilitate permeation of a manganese nitrate solution into the porous capacitor chip A1' at the time of forming the solid electrolyte layer.

However, the capacitor element shown in FIGS. 14 and 15 has been found still disadvantageous in the following points.

First, since each of the grooves A6' extends all the way from the top surface A1$a$' of the chip A1' to the bottom surface A1$b$', the electrostatic capacity of the capacitor element reduces considerably due to the provision of the grooves. Thus, the size of the capacitor element need be increased in an axial direction of the anode wire A2' to compensate for a volumetric reduction resulting from the provision of the grooves A6'.

Secondly, since each of the grooves A6' extends all the way from the top surface A1$a$' of the chip A1' to the bottom surface A1$b$', a manganese nitrate solution is allowed to flow down quickly along the grooves A6' when the chip A1' is taken out of the solution at the time of forming a solid electrolyte layer. Thus, the process steps of immersing the chip A1' in the manganese nitrate solution and thereafter baking the chip need be repeated sufficiently until the solid electrolyte layer grows completely.

SUMMARY OF THE INVENTION

It is, therefore, an object of the present invention is to provide a capacitor element which eliminates or reduces the above-described problems.

Another object of the present invention is to provide a compacting device which can be advantageously used for making such a capacitor element.

A further object of the present invention is to provide a process for making such a capacitor element.

According to a first aspect of the present invention, there is provided a capacitor element for a solid electrolytic capacitor comprising: a capacitor chip which is a compacted mass of valve metal powder, the capacitor chip having a first end face and a second end face opposite to the first end face; and an anode wire projecting from the first end face of the capacitor chip; wherein the capacitor chip includes at least one side face which is formed with at least one depression extending toward but short of the second end face of the capacitor chip.

In one embodiment of the present invention, said at least one depression includes a first limit wall spaced from the second end face of the capacitor chip and a second limit wall spaced from the first end face of the capacitor chip.

In another embodiment of the present invention, said at least one depression extends from the first end face of the capacitor chip toward but short of the second end face of the capacitor chip.

In either embodiment, said at least one side face of the capacitor chip may preferably have a plurality of depressions each of which extends toward but short of the second end face of the capacitor chip.

According to a second aspect of the present invention, there is provided a compacting device for making a capacitor element comprising: a lower die member having an upwardly open shaping groove; an upper die member for supporting an anode wire to project downwardly, the upper die member being movable toward and away from the lower die member; and an opposite pair of presser die members slidably fitted in the shaping groove of the lower die for reciprocative movement toward and away from each other, at least one of the presser die members having a front surface formed with at least one projection.

Preferably, each of the presser die members may have a front surface formed with a projection in alignment with the anode wire.

According to a third aspect of the present invention, there is provided a process for making a capacitor element by using a compacting device which comprises: a lower die member having an upwardly open shaping groove; an upper die member for supporting an anode wire to project downwardly, the upper die member being movable toward and away from the lower die member; and an opposite pair of presser die members slidably fitted in the shaping groove of the lower die for reciprocative movement toward and away from each other, at least one of the presser die members having a front surface formed with at least one projection; the method comprising the steps of: loading a predetermined amount of valve metal powder into the shaping groove of the lower die member between the presser die members; moving the upper die member toward the lower die member to close the shaping groove; and moving the presser die members toward each other for compacting the loaded valve metal powder.

Other objects, features and advantages of the present invention will be apparent from the detailed description of a preferred embodiments given below with reference to the accompanying drawings.

DETAILED DESCRIPTION OF THE PREFERRED EMBODIMENTS

The preferred embodiments of the present invention will be described below with reference to FIGS. 1 through 8 of the accompanying drawings.

Figure 1:
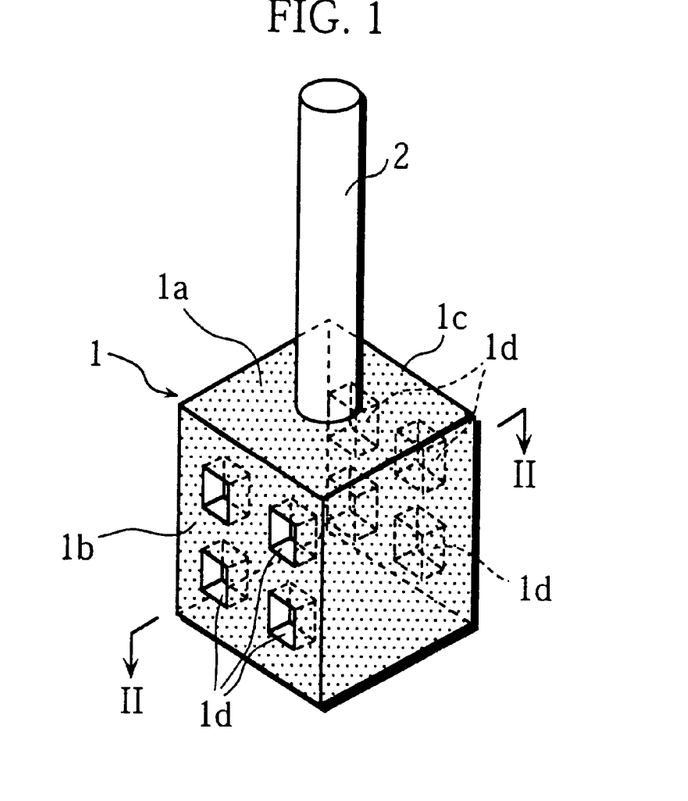
FIG. 1 is a perspective view showing a capacitor element according to a first embodiment of the present invention.
Figure 2:
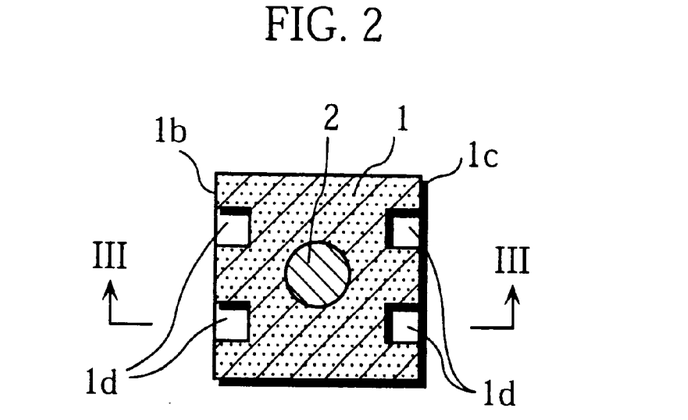
FIG. 2 is a sectional view taken on lines II—II in FIG. 1.
Figure 3:
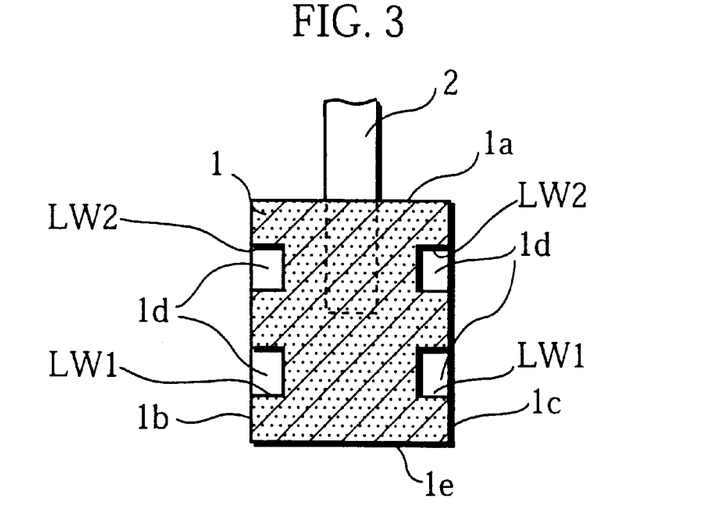
FIG. 3 is a sectional view taken on lines III—III in FIG. 1.

Reference is first made to FIGS. 1 through 3 illustrating a solid electrolytic capacitor element according to a first embodiment of the present invention. Like a conventional capacitor element, the capacitor element of this embodiment includes a porous capacitor chip 1 and an anode wire 2 projecting from a first end face 1a of the chip 1. The capacitor chip 1, which is cubic in the illustrated embodiment, may be prepared by compacting valve metal powder such as tantalum powder into a porous mass and then sintering the porous mass. The anode wire 2 may be made of tantalum or other metal. Normally, the anode wire 2 is partially embedded in the chip 1, as shown in FIG. 3.

The capacitor chip 1 has an opposite pair of side faces 1b, 1c each of which is formed with a plurality of depressions 1d. Each of the depressions 1d extends short of a second end face 1e of the chip 1 opposite to the first end face 1a and has a first limit wall LW1 (see FIG. 3). Further, each of the depressions 1d also extends short of the first end face 1a of the chip 1 and has a second limit wall LW2.

In manufacture, the porous sintered capacitor chip 1 thus configured is immersed in an aqueous solution of e.g. phosphoric acid (not shown) and subjected to anodic oxidation (electrolytic oxidation) by applying a direct current, as conventionally performed (see FIG. 10). As a result, a dielectric coating of e.g. tantalum pentoxide (not shown) is formed on the surfaces of the metal particles and on an immersed root portion of the anode wire 2 (see FIG. 11).

Then, the dielectrically coated chip 1 is immersed in an aqueous solution of e.g. manganese nitrate (not shown) to such an extent that the first end face 1a of the chip 1 is not submerged under the surface of the manganese nitrate solution, the chip 1 being thereafter taken out of the solution for baking. This step is repeated plural times to form a layer of solid electrolyte (e.g. manganese dioxide) on the dielectric coating.

Finally, a metallic cathode terminal layer (made of silver or nickel for example) is formed on the solid electrolyte layer with an intervening layer of e.g. graphite being interposed between the cathode terminal layer and the electrolyte layer.

In the above-described process of manufacture, each of the depressions 1d facilitates permeation of the manganese nitrate solution into the porous capacitor chip 1 at the time of performing the solid electrolyte formation. Further, the lower limit wall LW1 of each depression 1d serves as a dam for limiting downward flow or escape of the manganese nitrate solution when the chip 1 is taken out of the solution after immersion. Thus, a portion of the solution retained in the depression 1d continues to permeate into the porous chip 1 after immersion and before baking, thereby reducing the required number of repetitions of immersing the chip into the solution for realizing complete permeation.

Further, the first and second limit walls LW1, LW2 of each depression 1d provide an increase of surface area which wholly or partially offsets a surface area decrease resulting from shortening the length of the depression 1d in comparison with each groove of the prior art capacitor chip (FIGS. 14 and 15).

Moreover, a volumetric reduction of the capacitor chip 1 caused by the formation of the depressions 1d is smaller than that caused by the formation of grooves in the prior art capacitor chip (FIGS. 14 and 15). Thus, the electrostatic capacity of the capacitor chip 1 (namely, the capacity of the capacitor incorporating the capacitor chip 1) can be maintained relatively high in spite of the provision of the depressions 1d for increasing the surface area of the chip 1.

Figure 4:
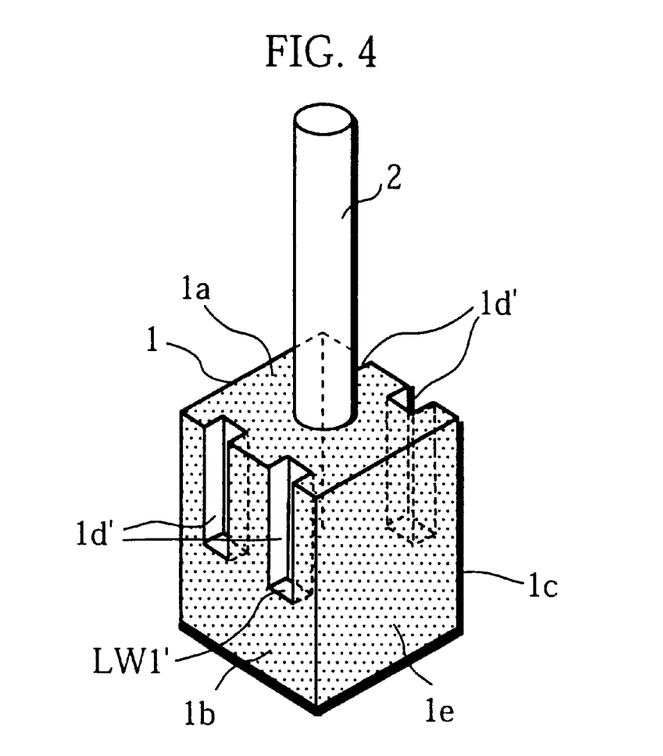
FIG. 4 is a perspective view showing a capacitor element according to a second embodiment of the present invention.

FIG. 4 shows a capacitor element according to a second embodiment of the present invention. The capacitor element of this embodiment is similar to that of the foregoing embodiment but differs therefrom in that each of two opposite side surfaces 1b, 1c of the chip 1 is formed with a plurality of elongated depressions 1d' each of which extends from the first end face 1a of the chip 1 toward but short of the second end face 1e. In other words, each elongated depression 1d' has a limit wall LW1' which serves as a dam for limiting downward flow of a manganese nitrate solution.

Figure 5:
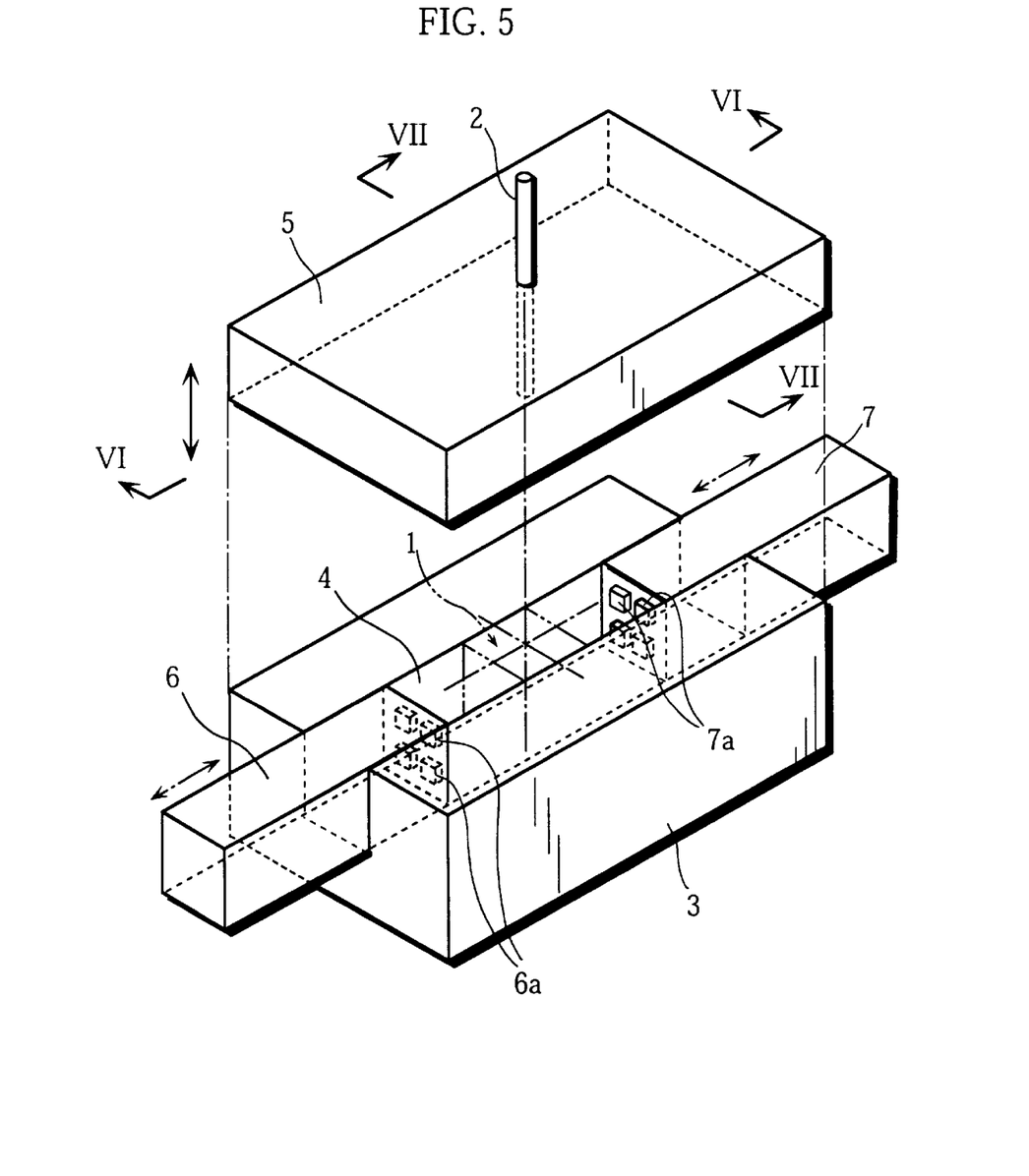
FIG. 5 is a perspective view showing a compacting device used for preparing the capacitor element shown in FIGS. 1 through 3.
Figure 6:
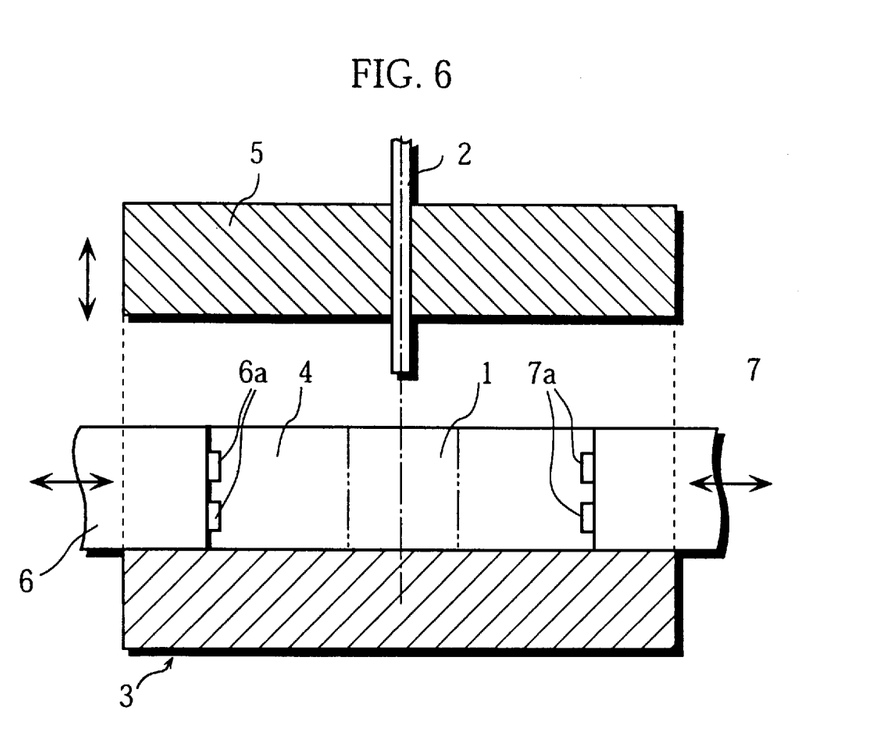
FIG. 6 is a sectional view taken on lines VI—VI in FIG. 5.
Figure 7:
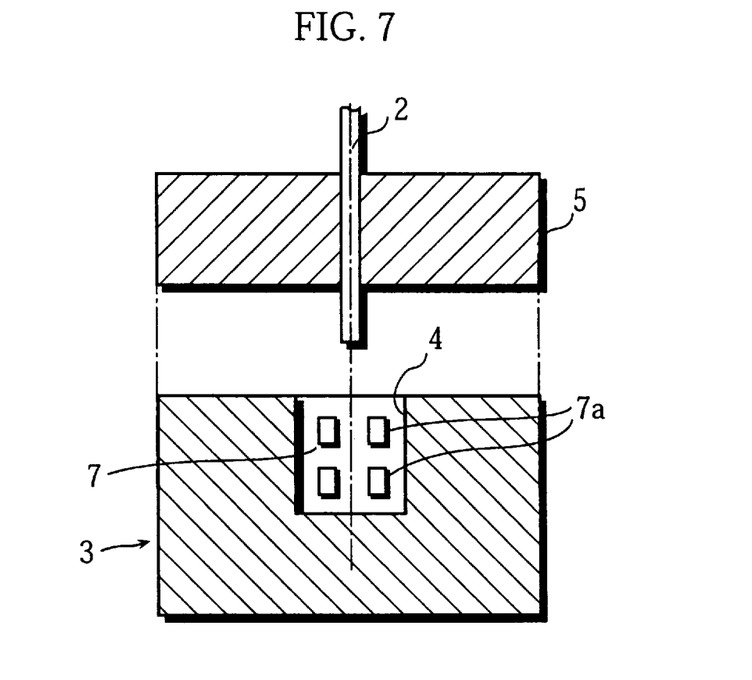
FIG. 7 is a sectional view taken on lines VII—VII in FIG. 5.

The capacitor chip 1 illustrated in FIGS. 1 through 3 may be advantageously prepared by using a compacting device shown in FIGS. 5 through 7. Specifically, the compacting device includes a lower die member 3 having an upwardly open shaping groove 4, an upper die member 5 which is movable toward and away from the lower die member 3, and a pair of presser die members 6, 7 slidably movable in the shaping groove 4 of the lower die member 3 toward and away from each other. Each of the presser die members 6, 7 has a front surface formed with a plurality of projections 6a, 7a.

In use, a predetermined amount of valve metal powder is loaded in the shaping groove 4 of the lower die member 3 between the presser die members 6, 7 which are brought away from each other. Then, an anode wire 2 is supported to project downwardly through the upper die member 5 which is then moved toward the lower die member 3 to close the shaping groove 4. Finally, the presser die members 6, 7 are moved simultaneously toward each other. As a result, a capacitor element is obtained which has the structure illustrated in FIGS. 1 through 3.

During the above-described process of preparing the capacitor element, the valve metal powder is compacted primarily in a direction perpendicular to the anode wire 2 because the compacting mainly results from approaching movement of the presser die members 6, 7. Further, the presence of the projections 6a, 7a for forming the depressions 1d causes a higher compression of the valve metal power around the anode wire 2. As a result, a root portion of the anode wire 2 can be firmly fixed or embedded in the capacitor chip 1 with little likelihood of unexpected removal.

Figure 8:
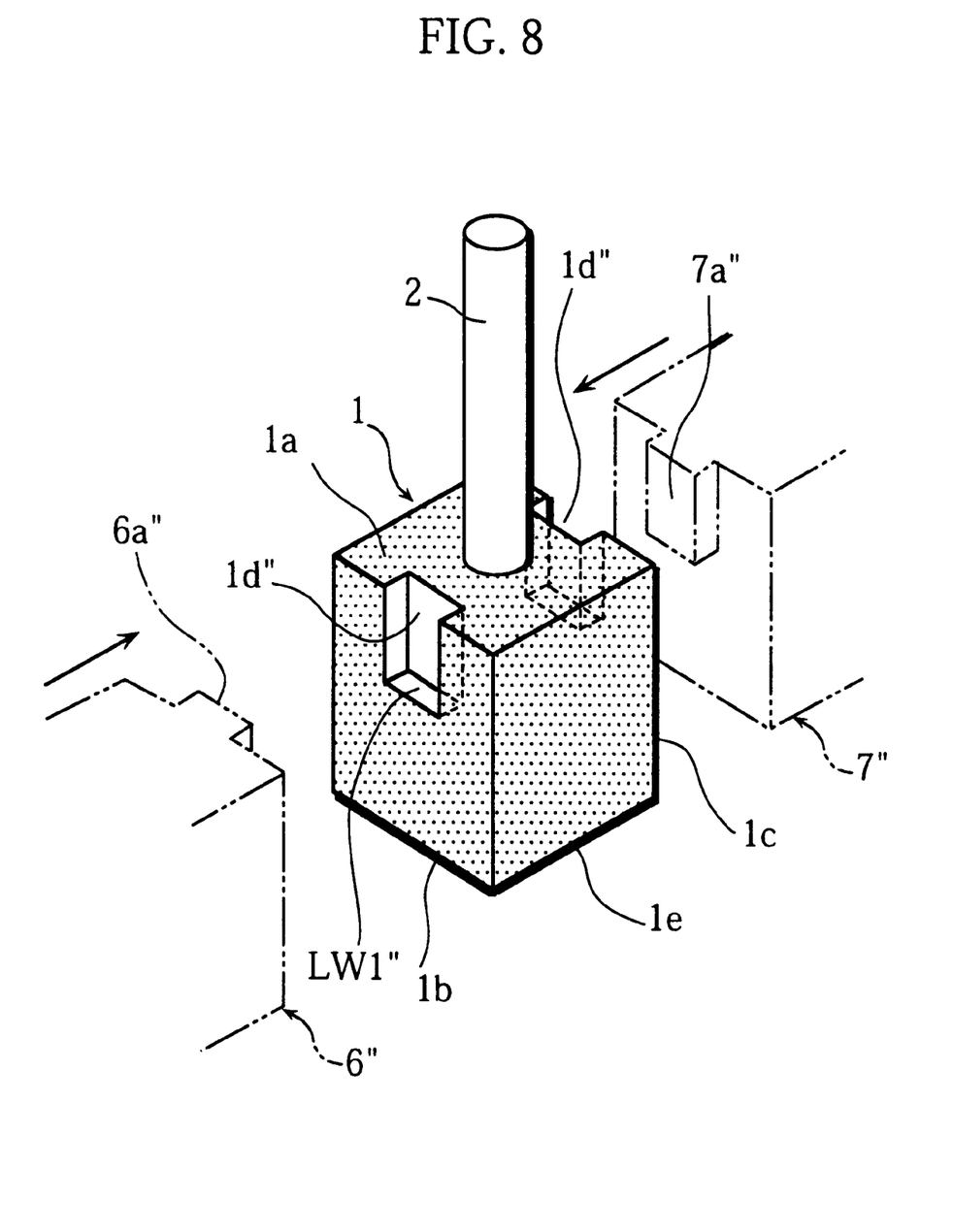
FIG. 8 is a perspective view showing a capacitor element according to a third embodiment of the present invention.

FIG. 8 shows a capacitor element according to a third embodiment of the present invention. The capacitor element of this embodiment is similar to that of the second embodiment but differs therefrom in that each of two opposite side surfaces 1b, 1c of the chip 1 is formed with a single elongated depression 1d" which has a limit wall LW1" as a dam for limiting downward flow of a manganese nitrate solution.

The capacitor chip 1 of the third embodiment may be prepared by using a compacting device which is similar to that shown in FIGS. 5 through 7 but which differs therefrom only in that each of two opposite presser die members 6", 7" has only a single projection corresponding in position and configuration to the respective depression 1d" of the chip 1.

According to the third embodiment, the depressions 1d" on both of the opposite side faces 1b, 1c and the anode wire 2 are aligned in position (widthwise of the chip 1). Thus, a root portion of the anode wire 2 is fixed or embedded even more firmly in the chip 1 when valve metal powder is compacted in the chip 1.

The present invention being thus described, it is obvious that the same may be varied in many other ways. For instance, the depressions may be formed only on one side face of the capacitor chip 1. Such variations should not be regarded as a departure from the spirit and scope of the present invention, and all such modifications as would be obvious to those skilled in the art are intended to be included within the scope of the following claims.

We claim:

1. A capacitor element for a solid electrolytic capacitor comprising:

a capacitor chip which is a compacted mass of valve metal powder, the capacitor chip having a first end face and a second end face opposite to the first end face; and an anode wire projecting from the first end face of the capacitor chip;

wherein the capacitor chip includes at least one side face which is formed with at least one depression extending toward but short of the second end face of the capacitor chip.

2. The capacitor element according to claim 1, wherein said at least one depression includes a first limit wall spaced from the second end face of the capacitor chip and a second limit wall spaced from the first end face of the capacitor chip.

3. The capacitor element according to claim 1, wherein said at least one depression extends from the first end face of the capacitor chip toward but short of the second end face of the capacitor chip.

4. The capacitor element according to claim 1, wherein said at least one side face of the capacitor chip has a plurality of depressions each of which extends toward but short of the second end face of the capacitor chip.

5. The capacitor element according to claim 1, wherein the capacitor chip includes two opposite side faces each of which is formed with at least one depression extending toward but short of the second end face of the capacitor chip.

6. The capacitor element according to claim 5, wherein each of the two opposite side faces of the capacitor chip is formed with a plurality of depressions each extending toward but short of the second end face of the capacitor chip.

7. The capacitor element according to claim 6, wherein each of the depressions includes a first limit wall spaced from the second end face of the capacitor chip and a second limit wall spaced from the first end face of the capacitor chip.

8. The capacitor element according to claim 6, wherein each of the depressions extends from the first end face of the capacitor chip toward but short of the second end face of the capacitor chip.

9. The capacitor element according to claim 5, wherein the depressions on said two opposite side faces of the capacitor chip and the anode wire are aligned with each other.

10. A compacting device for making a capacitor element comprising:

a lower die member having an upwardly open shaping groove;

an upper die member for supporting an anode wire to project downwardly, the upper die member being movable toward and away from the lower die member; and an opposite pair of presser die members slidably fitted in the shaping groove of the lower die member for reciprocative movement toward and away from each other, at least one of the presser die members having a front surface formed with at least one projection.

11. The compacting device according to claim 10, wherein each of the presser die members has a front surface formed with a projection in alignment with the anode wire.

* * * * *